P. D. HARROWER.
DEMOUNTABLE WHEEL RIM.
APPLICATION FILED SEPT. 15, 1914.

1,134,740.

Patented Apr. 6, 1915.
2 SHEETS—SHEET 1.

WITNESSES:

INVENTOR.
Paul D. Harrower.
BY
ATTORNEYS.

P. D. HARROWER.
DEMOUNTABLE WHEEL RIM.
APPLICATION FILED SEPT. 15, 1914.

1,134,740.

Patented Apr. 6, 1915.
2 SHEETS—SHEET 2.

WITNESSES:

INVENTOR.
Paul D. Harrower.
BY
ATTORNEYS:

UNITED STATES PATENT OFFICE.

PAUL D. HARROWER, OF CHELSEA, MASSACHUSETTS.

DEMOUNTABLE WHEEL-RIM.

1,134,740.  Specification of Letters Patent.  Patented Apr. 6, 1915.

Application filed September 15, 1914. Serial No. 861,777.

*To all whom it may concern:*

Be it known that I, PAUL D. HARROWER, a citizen of the United States, and resident of Chelsea, in the county of Suffolk and State of Massachusetts, have invented certain new and useful Improvements in Demountable Wheel-Rims, of which the following is a specification.

This invention relates to motor vehicle wheels, and has for its object to provide an improved construction for detachably connecting a pneumatic tire with said wheel.

The invention consists in the improvements which I will now proceed to describe and claim.

Figure 1:
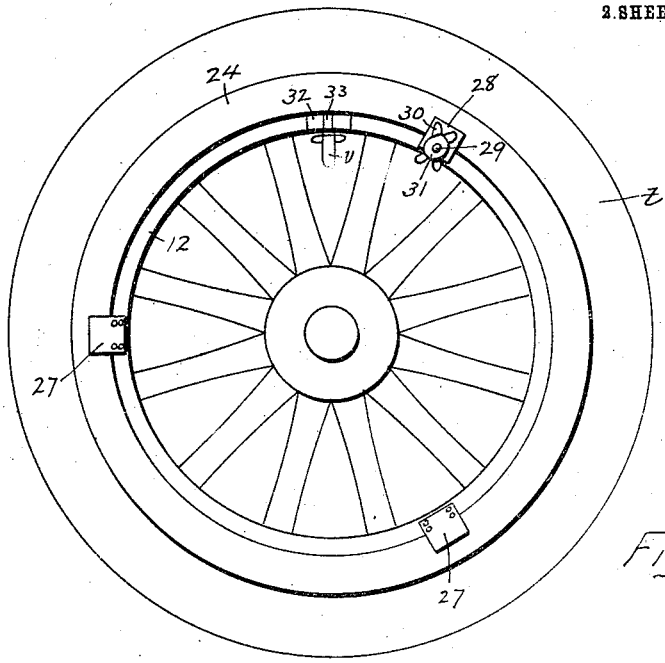
Figure 2:
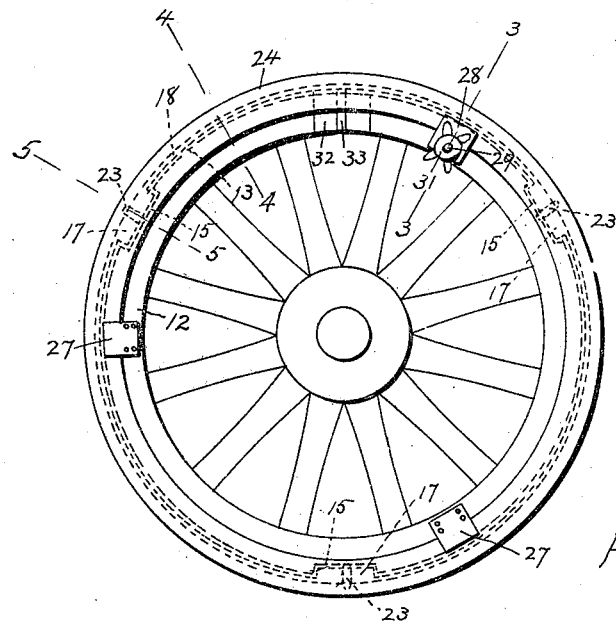
Figure 3:
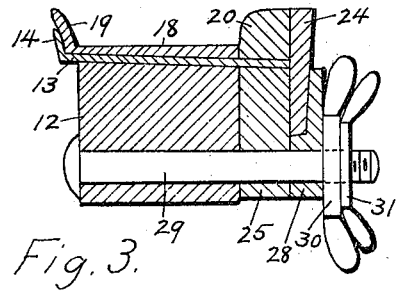
Figure 4:
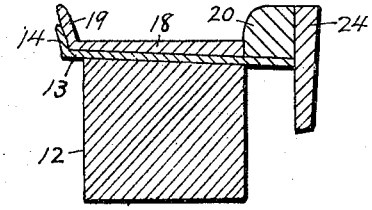
Figure 5:
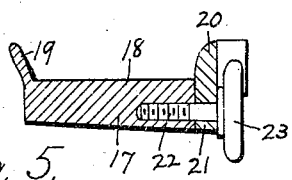
Figure 6:
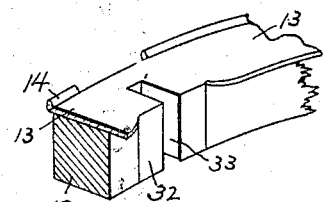
Figure 7:
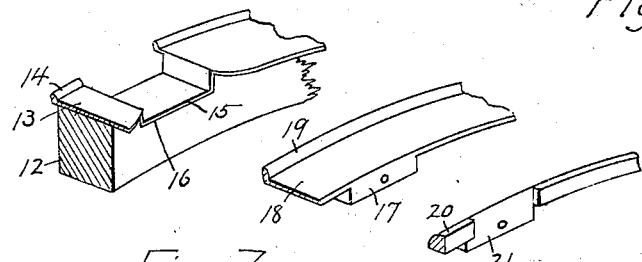
Figure 8:
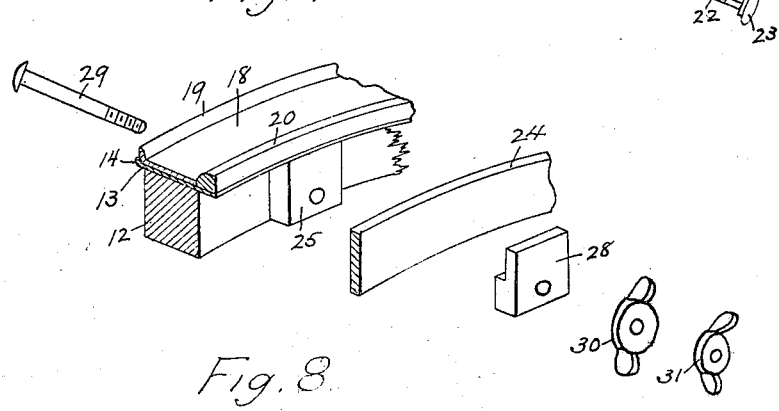

Of the accompanying drawings forming a part of this specification: Figure 1 represents a side elevation of a wheel embodying my invention and the tire in place thereon; Fig. 2 represents a view similar to Fig. 1, the tire being removed and certain parts not represented in Fig. 1 being shown by dotted lines; Fig. 3 represents a section on line 3—3 of Fig. 2; Fig. 4 represents a section on line 4—4 of Fig. 2; Fig. 5 represents a section on line 5—5 of Fig. 2; Fig. 6 represents a perspective view, showing portions of the felly and the fixed inner rim; Fig. 7 represents in perspective parts of the felly and the inner rim assembled, also parts of the demountable rim and the removable flange, and one of the flange securing screws, these parts being separated from each other and from the felly and inner rim; Fig. 8 represents a perspective view, showing portions of the felly, the inner rim, the outer rim, and the removable flange, these parts being assembled, and also showing a portion of the clamping ring, the removable clip, and the bolt and nuts which secure said clip to the felly.

The same reference characters indicate the same or similar parts in all the views.

In the drawings, 12 represents the felly of the wheel, which is here shown as made of wood, but may be of metal if desired, and of the form shown or any other suitable form. On the felly is a fixed inner rim 13 having a lip or flange 14, adapted to prevent edgewise displacement in one direction of the demountable rim hereinafter described, and a series of inwardly offset portions 15, which enter recesses 16 (Fig. 7) formed in the felly. Said offset portion and recesses prevent the fixed rim from turning on the felly, the recesses forming transverse sockets to receive lugs 17 on the demountable rim 18 to prevent the latter from turning on the fixed rim. The demountable rim 18 is narrower than the fixed rim and is provided at one edge with a lip or flange 19 abutting against the flange 14 of the fixed rim, so that the flange 14 prevents edgewise displacement of the demountable rim in one direction. The flange 19 in turn prevents edgewise displacement in the same direction, of a tire $t$ on the demountable rim.

20 represents a removable annular flange which is removably seated on one edge portion of the fixed rim 13, and abuts against one edge of the demountable rim to prevent edgewise displacement of both the demountable rim and the tire in the opposite direction. The removable flange 20 has a series of lugs 21 which are secured to the lugs 17 by screws 22 (Figs. 5 and 7) engaging tapped orifices in the lugs 17 and passing through orifices in the lugs 21, said screws having heads 23.

24 represents a clamping ring bearing on the outer edge of the removable flange 20 and the corresponding edge of the fixed inner rim. The clamping ring 24 is wider than the flange 20 and its inner portion has a lateral support on the felly, said support being preferably provided by reinforcing blocks 25 bearing on one of the side faces of the felly and suitably attached thereto. The clamping ring is detachably secured by two fixed clips 27 (Figs. 1 and 2) bolted to the felly 12, and a detachable clip 28 (Figs. 1, 2 and 3) secured to the felly by a bolt 29 and thumb nuts 30 and 31 engaged with said bolt.

The fixed rim is preferably provided with a reinforcing block or enlargement 32 (Fig. 6) which forms a part of the felly, and when the felly is made of wood is interposed between adjacent wooden members, the continuity of the wood portion of the felly being interrupted by an opening which receives the enlargement 32. Said enlargement has a slot 33 opening through one side and adapted to receive the inflating valve $v$ of the tire $t$ and permit the application and removal of the valve with the tire and the demountable rim, the means for securing the demountable rim having provisions or being organized to permit the removal of said ring in the direction required to remove the valve from the slot. When the nuts 30 and 31 are removed and the bolt 29 is withdrawn from the clip 28, said clip is released and the clamping ring 24 is free to be separated by an edgewise movement from the fixed clips 27 and removed from the wheel, the removable flange 20 and outer rim 18 being then removable sidewise. The fixed rim 13 is preferably slightly tapered, one edge being of smaller diameter than the other, as shown by Figs. 3 and 4, the inner surfaces of the demountable rim 18 and removable flange 20 being correspondingly tapered. Provision is thus made for a close fit of the rim 18 and flange 20 on the fixed rim. The reinforcing blocks 25 furnish solid metal bearings for the clamping ring 24, the clips 27 and 28, and the bolt which secures the detachable clip 28.

While I have shown the rim formed to engage a straight side tire, it is obvious that the rim may be adapted to engage tires otherwise formed.

Having described my invention, I claim:

1. The combination of a felly, a fixed rim having a flange at one edge adapted to prevent edgewise displacement in one direction of another rim mounted thereon, a demountable rim fitted to the fixed rim and having tire-confining flanges, a clamping ring confining the demountable rim on the fixed rim, and ring-securing means comprising fixed clips mounted on the felly and arranged to permit edgewise displacement of the clamping ring, and a removable clip detachably secured to the felly and coöperating with the fixed clips in securing the ring, said ring being removable edgewise when the removable clip is displaced.

2. The combination of a felly having an opening interrupting its continuity, a fixed rim thereon having an inwardly projecting reinforcing block occupying said opening and slotted to receive a tire valve, the slot being open at one side of the felly, a demountable rim fitted to the fixed rim and provided with a tire valve extending through said slot, a clamping ring bearing on one edge of the demountable rim and extending across the open end of said slot, and means for detachably securing said ring to the felly, the removal of the clamping ring permitting the removal of the demountable rim from the fixed rim, and the removal of the valve from the slot.

3. The combination of a felly having reinforcing blocks on one of its sides, a fixed rim wider than the felly and having a flange at one edge adapted to prevent edgewise displacement in one direction of another rim mounted thereon, the opposite edge of said fixed rim projecting over the outer ends of said reinforcing blocks, a demountable rim fitted to the fixed rim and having tire-confining flanges, a clamping ring bearing on the outer faces of said reinforcing blocks and on one of the flanges of the demountable rim, and means for detachably securing said ring to the felly and reinforcing blocks.

In testimony whereof I have affixed my signature, in presence of two witnesses.

PAUL D. HARROWER.

Witnesses:
C. F. BROWN,
PETER W. PEZZETTI.